US011580496B2

(12) United States Patent
Bastide et al.

(10) Patent No.: US 11,580,496 B2
(45) Date of Patent: Feb. 14, 2023

(54) MANAGING MEETING DIVERGENCE

(71) Applicant: INTERNATIONAL BUSINESS MACHINES CORPORATION, Armonk, NY (US)

(72) Inventors: Paul R. Bastide, Ashland, MA (US); Yael Alkalay, Brookline, MA (US); Fang Lu, Billerica, MA (US); Uri Kartoun, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 16/418,009

(22) Filed: May 21, 2019

(65) Prior Publication Data

US 2020/0372466 A1 Nov. 26, 2020

(51) Int. Cl.
*G06Q 10/10* (2012.01)
*G06F 16/35* (2019.01)
*H04L 67/10* (2022.01)
*H04L 65/403* (2022.01)

(52) U.S. Cl.
CPC ........... *G06Q 10/10* (2013.01); *G06F 16/358* (2019.01); *H04L 65/403* (2013.01); *H04L 67/10* (2013.01)

(58) Field of Classification Search
CPC ........... G06Q 10/00; G06Q 10/063116; G06Q 10/06314; G06Q 10/10; G06Q 10/1095; G07F 19/328; G06F 16/358
See application file for complete search history.

(56) References Cited

U.S. PATENT DOCUMENTS

| 6,754,631 | B1 | 6/2004 | Din | |
| 8,948,059 | B2 * | 2/2015 | Rodman | H04L 12/66 370/261 |
| 9,558,181 | B2 | 1/2017 | Cecchi | |
| 10,642,889 | B2 * | 5/2020 | Reshef | G06F 16/685 |

(Continued)

FOREIGN PATENT DOCUMENTS

CA 2766503 A1 * 1/2011 ......... H04L 12/1827

OTHER PUBLICATIONS

Yu, "Capture recognition and visualization of human semantic interactions in meetings" (Year: 2009).*

(Continued)

*Primary Examiner* — Sangeeta Bahl
(74) *Attorney, Agent, or Firm* — Steven M. Bouknight

(57) ABSTRACT

A method, a computer program product, and a computer system manage meeting divergence for a meeting involving a plurality of participants to discuss a plurality of core intents. The method includes receiving a first contribution from a first one of the participants during the meeting. The method includes determining a first one of the core intents that the first contribution is associated. The method includes determining a linkage of the first contribution to at least one second, previous contribution provided during the meeting. The method includes generating a graphical representation of a progress of the meeting, the graphical representation including a first visual indicator corresponding to the first contribution and at least one second visual indicator respectively corresponding to the at least one second contribution. The first visual indicator is positioned with respect to the at least one second visual indicator to represent the linkage.

14 Claims, 6 Drawing Sheets

(56) References Cited

U.S. PATENT DOCUMENTS

| | | | |
|---|---|---|---|
| 2011/0029893 A1* | 2/2011 | Roberts | G06Q 10/10 |
| | | | 715/753 |
| 2011/0072362 A1* | 3/2011 | Denner | G06Q 10/109 |
| | | | 715/751 |
| 2015/0112748 A1* | 4/2015 | Kaye | H04W 4/02 |
| | | | 705/7.19 |
| 2016/0124940 A1 | 5/2016 | Cecchi | |
| 2016/0344779 A1 | 11/2016 | Jain | |
| 2017/0004207 A1 | 1/2017 | Baughman | |
| 2017/0132215 A1 | 5/2017 | Baughman | |
| 2017/0243171 A1 | 8/2017 | Bellamy | |
| 2018/0039951 A1* | 2/2018 | Wynn | H04N 7/15 |
| 2018/0101824 A1* | 4/2018 | Nelson | G06Q 10/1095 |
| 2019/0268385 A1* | 8/2019 | Faulkner | H04N 7/157 |
| 2020/0104802 A1* | 4/2020 | Kundu | G06F 3/04847 |

OTHER PUBLICATIONS

LeBlanc, "Planning and leading effective meetings" (Year: 2019).*
Mell et al., "The NIST Definition of Cloud Computing", National Institute of Standards and Technology, Special Publication 800-145, Sep. 2011, pp. 1-7.

* cited by examiner

MANAGING MEETING DIVERGENCE

BACKGROUND

The exemplary embodiments relate generally to managing a progress of a meeting, and more particularly to determining when the progress of the meeting diverges from a core intent of the meeting.

A meeting may be performed in person where the participants of the meeting gather in a common location and/or electronically where the participants log in remotely through a meeting client using video and/or audio inputs and outputs. The meeting may vary in complexity, length, tense, formality, productivity, etc. and the participants may be invited to the meeting based on the characteristics of the meeting and one or more intended core intents to be covered in the meeting. The participants may each provide contributions toward the core intents of the meeting based on roles, expertise, etc. During the meeting, the productivity of the meeting may trend negatively where the conversation may relate to topics different from the core intents of the meeting. When this occurs, the meeting is likely to diverge from the core conversation regarding the core intents of the meeting, leading to the meeting being run inefficiently and participants becoming frustrated.

SUMMARY

The exemplary embodiments disclose a method, a computer program product, and a computer system for managing meeting divergence for a meeting involving a plurality of participants to discuss a plurality of core intents. The method comprises receiving a first contribution from a first one of the participants during the meeting. The method comprises determining a first one of the core intents that the first contribution is associated. The method comprises determining a linkage of the first contribution to at least one second, previous contribution provided during the meeting. The method comprises generating a graphical representation of a progress of the meeting, the graphical representation including a first visual indicator corresponding to the first contribution and at least one second visual indicator respectively corresponding to the at least one second contribution. The first visual indicator is positioned with respect to the at least one second visual indicator to represent the linkage.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
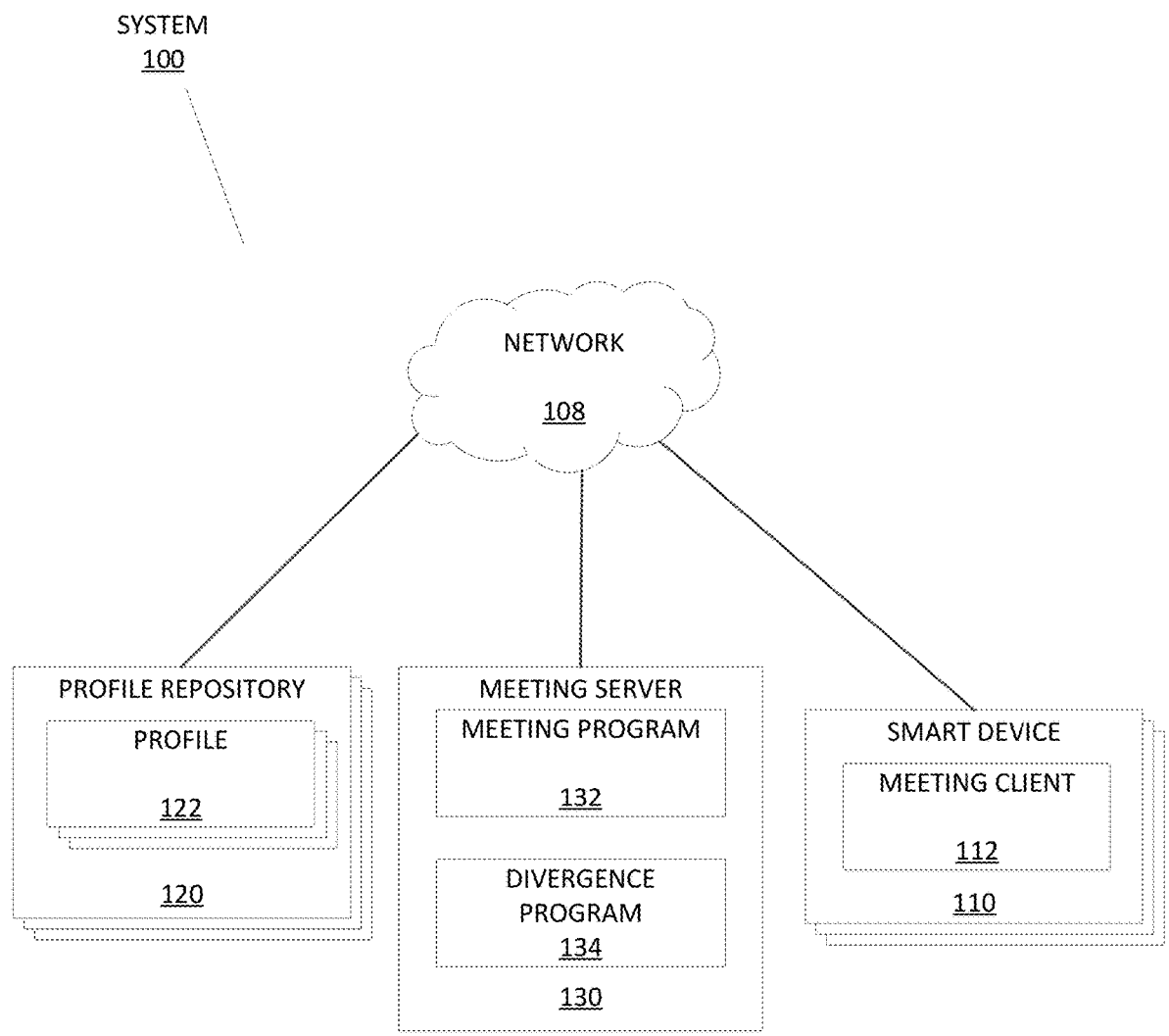
FIG. 1 depicts an exemplary schematic diagram of a meeting divergence evaluation system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

The exemplary embodiments are directed to a method, computer program product, and system for managing a meeting from diverging from a core intent of the meeting. As will be described in greater detail herein, the exemplary embodiments are configured to determine when the productivity of the meeting trends negatively where the conversation in the meeting deviates from a core intent. The exemplary embodiments may monitor a progress of the meeting and the contributions from the participants to determine how further contributions stay within the limits of the core intent. Key benefits of the exemplary embodiments may include engaging the participants of the meeting to contribute toward the core intents of the meeting and conduct the meeting in an efficient manner. Detailed implementation of the exemplary embodiments follows.

Conventional approaches to monitoring a progress of a meeting for divergence may entail utilizing participant specific characteristics, generating mechanisms to re-engage participants, etc. For example, the conventional approach may determine a cognitive state of a participant to determine the reason that a meeting conversation has diverged. In another example, the conventional approach may generate personalized, dynamic content that is presented to a participant as a way to re-engage the participant. However, these conventional approaches focus on a mindset of the participant while omitting consideration of contributions of the participants toward covering the intended core intents of the meeting. For example, although a participant may be determined to be losing interest in the meeting, the contributions of the participant may still be on point toward addressing an intended core intent. The exemplary embodiments are configured to determine linkages of contributions of the participants relative to one another and in a holistic view as well as basing the linkages on the personal characteristics of the participants (e.g., expertise, skill set, etc.). Through the linkages, the exemplary embodiments may identify where the meeting may have diverged from the core intents of the meeting and generate a remedy for any gap in the meeting conversation.

The exemplary embodiments are described with regard to determining divergence in a progress of a meeting based on the contributions from the participants. Particularly in a corporate setting, meetings drive business results where individuals collaborate to solve a problem by organizing the team to tackle a project. When individuals are remotely located, the meeting may serve a higher purpose for attaching business results. However, the exemplary embodiments being directed to the meeting and the contributions are only illustrative. The exemplary embodiments may be implemented or modified to be used in other scenarios involving a plurality of individuals who are collaborating to achieve an intended target and/or discuss a particular topic or corresponding core intent. For example, the exemplary embodiments may be implemented for a project involving a plurality of project members where each project member may contribute toward a completion of the project. The exemplary embodiments may determine how the contribution from the project members are linked to one another and toward the project as a whole to improve productivity and efficiency as well as identify gaps that may be present to complete the project.

The exemplary embodiments are also described with regard to utilizing information related to an expertise and/or skill set of a participant as a factor in determining how a contribution is linked to other contributions and toward the core intents of a meeting. However, the exemplary embodiments may utilize any characteristic of the participant in determining the linkages. For example, in addition to an expertise or a skill set, the characteristic may be any experience, personality trait, association, member status, historical link, etc. that may indicate a degree by which a contribution affects the meeting conversation.

FIG. 1 depicts a meeting divergence evaluation system 100, in accordance with the exemplary embodiments. According to the exemplary embodiments, the meeting divergence evaluation system 100 may include one or more smart devices 110, one or more profile repositories 120, and a meeting server 130, which may all be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. Accordingly, the components of the meeting divergence evaluation system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a WiFi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices. For example, the network 108 may also represent direct or indirect wired or wireless connections between the components of the meeting divergence evaluation system 100 that do not utilize the network 108.

In the exemplary embodiments, the smart device 110 may include a meeting client 112 and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an Internet of Things (IoT) device, or any other electronic device or computing system capable of receiving and sending data to and from other computing devices. While the smart device 110 is shown as a single device, in other embodiments, the smart device 110 may be comprised of a cluster or plurality of computing devices, in a modular manner, etc., working together or working independently. The smart device 110 is described in greater detail as a hardware implementation with reference to FIG. 4, as part of a cloud implementation with reference to FIG. 5, and/or as utilizing functional abstraction layers for processing with reference to FIG. 6.

In the exemplary embodiments, the meeting client 112 may act as a client in a client-server relationship and may be a software, hardware, and/or firmware based application capable of joining a meeting via the network 108. In embodiments, the meeting client 112 may operate as a user interface allowing a user to interact with one or more components of the meeting participation evaluation system 100, and utilize various wired and/or wireless connection protocols for data transmission and exchange associated with joining the meeting, including Bluetooth, 2.4gHz and 5gHz internet, near-field communication, Z-Wave, Zigbee, etc.

When the smart device 110 is associated with a user, the meeting client 112 may be configured to provide, to the user, a user interface of the meeting that is being joined. For example, the meeting client 112 may generate a video and/or audio interface. The video interface may allow the user of the smart device 110 to view other participants of the meeting and/or transmit a view of the user to the other participants while the audio interface may allow the user of the smart device 110 to receive audio output from other participants of the meeting and/or transmit audio input of the user to the other participants. When the meeting is run in person as well as remotely, the user joining the meeting remotely and the smart device 110 may be in a remote location. Thus, in the user interface, the meeting client 112 may provide a video and/or audio interface of the meeting room for participants who joined the meeting in person. When the smart device 110 is associated with a location, the meeting client 112 may perform substantially similar operations and provide the user interface of the meeting to participants convened at the location (e.g., a video and/or audio output of a user joining the meeting remotely, a video and/or audio output of another meeting room for further participants convening at a different location, etc.). The meeting client 112 may perform similar functions with respect to hosting project collaborations and the like.

In the exemplary embodiments, the profile repository 120 may include one or more profiles 122 and may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of storing, receiving, and sending data to and from other computing devices. While the profile repository 120 is shown as a single device, in other embodiments, the profile repository 120 may be comprised of a cluster or plurality of electronic devices, in a modular manner, etc., working together or working independently. While the profile repository 120 is also shown as a separate component, in other embodiments, the profile repository 120 may be incorporated with one or more of the other components of the meeting divergence evaluation system 100. For example, the profile repository 120 may be incorporated in the meeting server 130. Thus, access to the profile repository 120 by the meeting server 130 may be performed locally. In another example, the profile repository 120 may be incorporated in the smart device 110 (e.g., each smart device 110 has a profile repository 120 including at least the profile 122 of the user who is respectively associated). Thus, access to the profile repository 120 and to a specific one of the profiles 122 may be performed through a transmission from the smart device 110. The profile repository 120 is described in greater detail as a hardware implementation with reference to FIG. 4, as part of a cloud implementation with reference to FIG. 5, and/or as utilizing functional abstraction layers for processing with reference to FIG. 6.

In the exemplary embodiments, the profiles 122 may be associated with respective members of a population of users who may join meetings. The profiles 122 may be populated with information that is manually provided by the respective users, endorsed by other users, etc. The profiles 122 may also be populated with information that is automatically determined based on various types of available information such as an educational history, an employment history, etc. The profiles 122 may include any information related to the users. For example, when the population is related to a corporation, the profiles 122 may include information indicating a job title, responsibilities of the job position, projects on which the user is a part, a primary location of the position, a reporting hierarchy, etc. In another example, the profiles 122 may include information indicative of expertise in various fields, technical or non-technical. The technical expertise may be, for example, a technical discipline, a scientific practice, etc. The non-technical expertise may be, for example, organizational skills, leadership, public speaking, etc.

In the exemplary embodiments, the meeting server 130 may include a meeting program 132 and a divergence program 134 and act as a server in a client-server relationship with the meeting client 112 as well as be in a communicative relationship with the profile repository 120. The meeting server 130 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the meeting server 130 is shown as a single device, in other embodiments, the meeting server 130 may be comprised of a cluster or plurality of computing devices, working together or working independently. The meeting server 130 is described in greater detail as a hardware implementation with reference to FIG. 4, as part of a cloud implementation with reference to FIG. 5, and/or as utilizing functional abstraction layers for processing with reference to FIG. 6.

In the exemplary embodiments, the meeting program 132 may be a software, hardware, and/or firmware application configured to host a meeting for the participants of the meeting. The meeting program 132 may host the meeting in a passive manner and/or an active manner. In the passive manner, the meeting may be performed at least partially in person. For example, there may be one or more meeting rooms at respective predetermined locations where one or more participants may convene at each location. The meeting program 132 may host an overall meeting by linking the one or more individual meeting rooms to other meeting rooms, both physical meeting rooms and electronic meeting rooms, to create a combined meeting room where all participants are part of the same overall meeting. When a physical meeting room is used, a smart device 110 may be at the location of the meeting room and associated therewith, instead of with an individual user. In this manner, the meeting client 112 of this smart device 110 for the physical meeting room may be used in the server-client relationship with the meeting server 130. In the active manner, the meeting may be performed at least partially remotely. For example, a user using the smart device 110 may utilize the meeting client 112 to remotely join the meeting. Thus, the meeting program 132 may create a respective electronic meeting room for each user joining the meeting remotely. The meeting program 132 may link the electronic meeting rooms to the overall meeting. When more than one meeting room (e.g., physical or electronic) is used, the meeting program 132 may be configured to exchange video, audio, text, documentation data, etc. among the participants of the meeting.

In the exemplary embodiments, the divergence program 134 may be a software, hardware, and/or firmware application configured to monitor the meeting and the contributions of the participants of the meeting. The divergence program 134 may identify the participants of the meeting and the contributions provided by each participant where the contributions may be verbal contributions (e.g., speech or text from the participant), non-verbal contributions (e.g., providing documentation, updating graphs being shown, etc.), or any other activity that may be construed as a contribution to the meeting. The divergence program 134 may also determine any corresponding expertise associated with each participant based on the profiles 122 included in the profile repository 120 as well as any other information that may be available or provided. The divergence program 134 may identify one or more core intents that are to be covered in the meeting. By monitoring a progress of the meeting and the contributions of the participants according to the identified core intents and the expertise of the participants, the divergence program 134 may determine linkages between the contributions with each other and holistically. As the meeting progresses, the divergence program 134 may determine a degree to which a core intent has been discussed in the meeting such that the divergence program may identify any gaps in each of the core intents that are still to be discussed. The divergence program 134 may be configured to generate a graphical representation of the meeting progression that includes the contributions and relative linkages as well as any gaps that may be detected.

During the meeting (e.g., towards an end of the scheduled time of the meeting) and/or once the meeting has concluded, the divergence program 134 may perform a subsequent action based on the linkages and the identified gaps to facilitate a closure of the core intents of the meeting. For example, the divergence program 134 may invite a participant who may provide a proper linkage for a gap. In the graphical representation, the divergence program 134 may present a specific shape that may fill the gap or compensate for a disparate shape corresponding to a particular conversation for a core intent. In another example, to the invited participant while the meeting is ongoing, the divergence program 134 may indicate how a contribution is to be provided (e.g., to fill the gap toward completing a conversation for a core intent). If the meeting has concluded, the divergence program 134 may provide a format on which the invited participant may contact the participants for a further contribution that fills the gap. In a further example, the divergence program 134 may generate settings that reconfigure the video and/or audio inputs and outputs. The reconfiguration may emphasize contributions from the participant during the meeting (e.g., lowering audio inputs from other participants while raising an audio output of the participant, raising an illumination of the participant while dimming an illumination of other participants, etc.).

The divergence program 134 may further be configured to identify when the participants are contributing during the meeting. For example, the divergence program 134 may identify the participant through text based contributions where the identity corresponds to an originating device (e.g., the smart device 110 on which a user has logged into the meeting client 112 to join the meeting). In another example, the divergence program 134 may be configured with voice recognition software that identifies the participant through audio inputs. When the participant is alone (e.g., joining the meeting remotely), the participating program 134 may also identify the participant based on the originating device. When the participant is in a meeting room with other participants, the participating program 134 may isolate the participants voice, analyze the voice, and determine the identity of the participant. In a further example, the divergence program 134 may utilize video inputs to identify when a participant is contributing (e.g., determining when a mouth of a participant is moving that corresponds to a particular audio input, determining when a participant is gesturing, etc.). In yet another example, the divergence program 134 may associate a voice with a specific participant or to a corresponding one of the profiles 122 of the participant (e.g., the smart device 110 being a phone that dials in to the meeting may be associated with a profile or participant). By determining the participant in the video input, the contribution may be linked to the participant.

Figure 2:
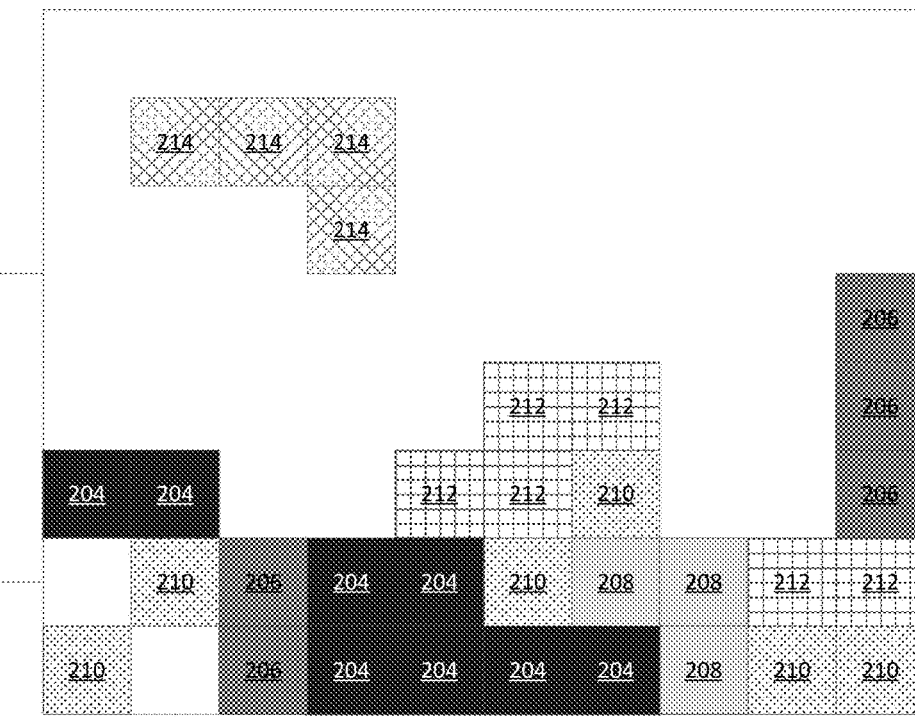
FIG. 2 depicts an exemplary progress interface providing information of a meeting and contributions from participants, in accordance with the exemplary embodiments.

As noted above, the divergence program 134 may generate a graphical representation that illustrates a progress of the meeting through the contributions provided by the participants toward covering the core intents of the meeting. FIG. 2 illustrates an exemplary progress interface 200 providing information of a meeting and contributions from participants, in accordance with the exemplary embodiments. The progress interface 200 may provide a visual indication of the progress of the meeting as well as individual progress indications for each core intent and linkages between contributions for the core intents that are to be discussed during the meeting.

In the exemplary embodiments, the progress interface 200 may include a graph 202 and a legend 218. The graph 202 may display the contributions from the participants represented as a visual indicator such as one or more blocks (e.g., a square) where a contribution represented with a plurality of blocks may exhibit a particular shape. Although the graph 202 is described with regard to a block being a square, the exemplary embodiments may utilize any representation of a contribution including different shapes (e.g., other polygons, curved shapes, an amorphous shape, etc.) that may indicate to a participant regarding the contributions, their linkages to other contributions, and their relevance to the meeting holistically. The divergence program 134 may be configured to analyze a particular contribution based on the participant, the participant's expertise, the relevance of the contribution to one or more of the core intents, the link of the contribution to other contributions, the link of the contribution to the meeting in a holistic manner, etc. As a result of this analysis, the divergence program 134 may determine a number of blocks to include to represent the contribution in the progress interface 200 and determine a shape to utilize for the contribution when a plurality of blocks is to be used. The divergence program 134 may further determine how the contribution represented with one or more blocks is to be positioned in the graph 202. When the contribution under analysis is the first contribution, the divergence program 134 may determine a location in the graph 202 based on the core intents to be discussed. For example, the divergence program 134 may position a contribution for a central core intent toward a central location in the graph 202. When the contribution under analysis is a further contribution after the first contribution and any other contribution that precedes the contribution under analysis, the divergence program 134 determine a location in the graph 202 based on the core intents to be discussed as well as relative to other contributions that have been placed.

In the illustrative progress interface 200, the divergence program 134 may have identified six core intents that are to be discussed in the meeting. Although the progress interface 200 is described with regard to six different core intents, the progress interface 200 may include any number of core intents as identified by the divergence program 134. Each core intent may be represented with a unique block type. For example, a first core intent may be represented with a first block type 204; a second core intent may be represented with a second block type 206; a third core intent may be represented with a third block type 208; a fourth core intent may be represented with a fourth block type 210; a fifth core intent may be represented with a fifth block type 212; and a sixth core intent may be represented with a sixth block type 214. The legend 218 may display the relationship between the block type and the core intent. As illustrated, the legend 218 shows a first relationship 220 between the first block type 204 with the a first core intent; a second relationship 222 between the second block type 206 with the a second core intent; a third relationship 224 between the third block type 208 with the a third core intent; a fourth relationship 226 between the fourth block type 210 with the a fourth core intent; a fifth relationship 228 between the fifth block type 212 with the a fifth core intent; and a sixth relationship 230 between the sixth block type 214 with the a sixth core intent. Each relationship 220-230 in the legend 218 may further indicate a status with respect to a progress or completion of discussing the core intent in the meeting. For example, the status may include "not discussed," "in progress," "at risk," "completed," etc. In monitoring the progress of the meeting, the divergence program 134 may determine whether a core intent has been discussed to a particular degree as defined by a plurality of thresholds for each status type according to an intent or goal associated with the core intent.

The divergence program 134 may be configured to update the progress interface 200 each time a contribution corresponding to the core intents has been provided by the participants. Thus, with each contribution, the divergence program 134 may identify the participant who provided the contribution, determine the linkage of the contribution to other contributions and to the meeting, and update the progress interface 200 accordingly. For example, as illustrated in the progress interface 200, a contribution may have been provided from a participant where the divergence program 134 determines the contribution is related to the sixth core intent. Thus, the divergence program 134 may determine that the contribution is to be represented with four of the sixth block type 214 and the four blocks are to exhibit an L-shape. The divergence program 134 may utilize a visual interaction within the graph 202 of the contribution being placed among the other contributions based on the linkages of the contribution to the other contributions and the relevance of the contribution to the meeting as a whole. The divergence program 134 may also be configured to update the progress interface 200 based on other criteria (e.g., at a time interval, when a status of a core intent changes, etc.).

The graph 202 of the progress interface 200 may also include empty regions 216. The empty regions 216 may represent gaps to be filled by further contributions based on the status of the core intents as well as to the linkages to the other contributions and the meeting as a whole. The divergence program 134 may determine when a core intent requires further contributions and represent this need as an empty region 216, particularly when the empty region 216 is interspersed within other contributions. When the empty region 216 is interspersed within blocks of other contributions, the divergence program 134 may indicate the gap of the core intent and the linkage to the core intent, the other contributions, and the meeting as a whole. Thus, a participant viewing the empty region 216 in the progress interface 200 may identify when a further contribution may be provided to complete a discussion for a core intent that may be linked to contributions of other core intents. The divergence program 134 may generate the graph 202 such that the meeting is considered complete (e.g., the core intents have been completely discussed based on the goals of the meeting) when the entirety of the graph 202 is occupied by one of the block types 204-214 and the relationships 220-230 in the legend 218 each indicate a status of "completed."

The progress interface 200 is described with regard to block types 204-214 representing core intents. Thus, the progress interface 200 does not indicate the individual contributions of the participants but shows an overall contribution toward the core intents by the participants as a group. However, the exemplary embodiments may also arrange the progress interface 200 such that the block types 204-214 may represent other aspects of the meeting and remain within the scope of the exemplary embodiments. For example, the divergence program 134 may generate the progress interface 200 based on the individual participants where an expertise of the participants may correspond to the core intents. In another example, the divergence program 134 may generate the progress interface 200 based on a plurality of aspects (e.g., the core intents and the participants).

Figure 3:
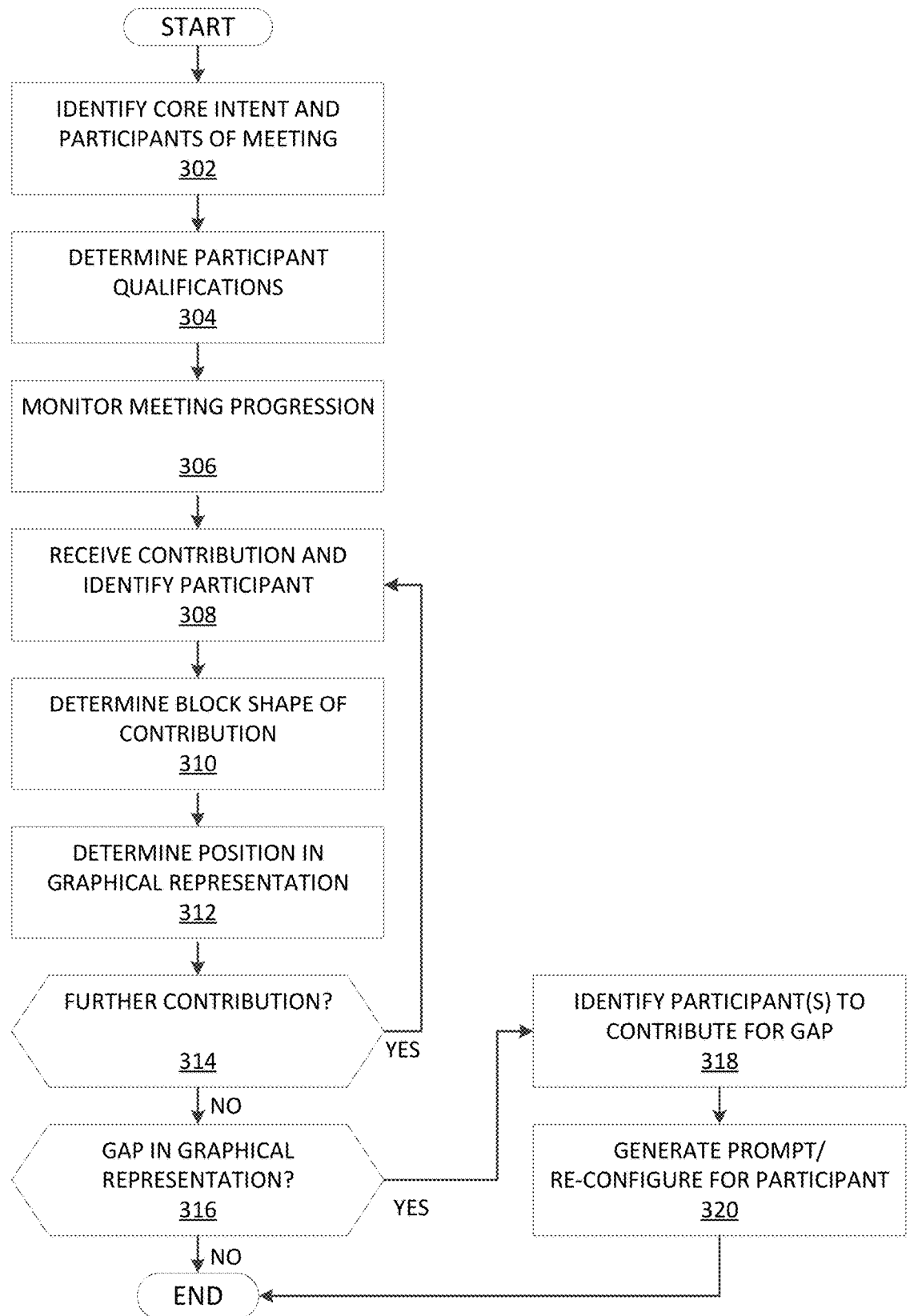
FIG. 3 depicts an exemplary flowchart illustrating the operations of a divergence program 134 of the meeting divergence evaluation system 100 for determining how contributions from participants focus on a core intent of the meeting, in accordance with the exemplary embodiments.

FIG. 3 illustrates the operations of the divergence program 134 of the meeting divergence evaluation system 100 for determining how contributions from participants focus on a core intent of the meeting, in accordance with the exemplary embodiments. Select operations of the divergence program 134 may be performed prior to the meeting starting while other operations of the divergence program 134 may be performed during the meeting and/or after the meeting has concluded.

The divergence program 134 may identify a core intent or meeting topic with a corresponding goal associated with the core intent as well as identify the participants of the meeting (step 302). The divergence program 134 may access any available information to ascertain the one or more core intents. For example, the divergence program 134 may extract agenda information of the meeting from calendar invitations or emails exchanged to schedule the meeting. In another example, the divergence program 134 may utilize other sources of information that may indicate or provide insight as to the meeting topic (e.g., emails, chat sessions, documents, etc.). The divergence program 134 may identify the one or more core intents in a plurality of ways. For example, the divergence program 134 may determine topics that are to be discussed during the meeting, goals to be achieved by the end of the meeting, etc. A participant (e.g., meeting leader) may also manually enter the core intents to be discussed in the meeting.

The divergence program 134 may also utilize substantially similar information to identify the participants of the meeting (step 302). For example, the divergence program 134 may identify the participants as users included in an email that is sent to schedule the meeting. The divergence program 134 may be configured to determine when a user included in the email may be included for administrative or corporate practice reasons so that such users may be omitted from the identified participants who are or will likely be providing contributions. A participant (e.g., meeting leader) may also manually indicate the participants who will be attending the meeting.

The divergence program 134 may identify the participants as an ongoing operation. For example, the divergence program 134 may determine the participants preliminarily, before the meeting is scheduled. As will be described below, the identification of the participants may enable the divergence program 134 to perform subsequent operations. In another example, the divergence program 134 may update the identified participants when the meeting has started and/or as the meeting progresses. Accordingly, the divergence program 134 may add any additional participants who may join the meeting or remove any participant who did not attend or left the meeting. The divergence program 134 may continue to update the participants throughout the meeting to reflect the participants who are still in the meeting.

The divergence program 134 may determine participant qualifications (step 304). The participant qualifications may include any expertise or skill set related to the meeting topic that each participant may possess. The divergence program 134 may access the profiles 122 of the identified participants and/or utilize any other information (e.g., the information used to identify the meeting intent and/or participants) to ascertain the expertise of the participants.

The meeting may then start at the scheduled time. As a result of the meeting starting, the divergence program 134 may monitor a progress of the meeting (step 306). With the participants of the meeting being dynamically determined, the divergence program 134 may update the participants with the individuals who have joined the meeting (e.g., any additions, any absentees, etc.). In monitoring the progress of the meeting, the divergence program 134 may receive contributions from the participants and identify the participant who provided each contribution (step 308). The divergence program 134 may track contributions provided by each participant through audio inputs (e.g., speech data), entered text (e.g., text messages shared via an instant message application that may be built into the meeting client 112), displayed documentation (content shared via a web conference tool), etc. The divergence program 134 may utilize various techniques to determine how the contributions correspond to the core intents. For example, for audio inputs that are spoken by the participants, the divergence program 134 may determine the spoken words and apply a natural language processing operation to break down the audio inputs and identify the relevance to the core intents. In another example, for entered text that is typed in by the participants, the divergence program 134 may also utilize the natural language processing operation to identify the relevance to the core intents. In a further example, for documentation or other data that is shared among the participants, the divergence program 134 may analyze the content included therein to identify the relevance to the content items. Through analysis of the contributions, the divergence program 134 may determine the relevance of the contribution to the core intents of the meeting in an individual manner and holistically.

The divergence program 134 may determine a block shape of the contribution (step 310) and determine a position of the contribution in the graphical representation (step 312). In generating the graph 202 of the progress interface 200, the divergence program 134 may determine how a contribution is to be represented as a block. For example, when the graph 202 represents blocks based on the core intent to which the contribution relates, the divergence program 134 may select a block type that corresponds to the core intent. When the graph 202 represents blocks based on the participant who provided the contribution, the divergence program 134 may select a block type that corresponds to the participant.

In another example, based on the blocks that have already been placed (e.g., from zero blocks to a plurality of different blocks), the divergence program 134 may determine one or more linkages between the present contribution and contributions that have already been placed in the graph 202. For the core intents of the meeting, a first core intent may be linked to a second core intent. Within the core intents of the meeting, a selected aspect of a core intent may be linked to one or more other aspects of the core intent. An aspect of a core intent may also be linked to one or more aspects of one or more other core intents. For example, the core intents of a meeting may include a user experience design, a software architecture review, a feature development, a unit test, a test case, etc. Each of these core intents may include a plurality of aspects or subtopics that may be specific for the meeting and to be discussed to complete the discussion of the corresponding core intent. Although each core intent and/or aspect of a core intent may be discussed in an individual capacity (whether intentional or inadvertent), the discussion or results from discussing the core intent or aspect thereof may impact one or more other core intents or one or more aspects (e.g., within the core intent or of other core intents). In determining the impact and the resulting linkages, the divergence program 134 may be configured with modelling techniques, machine learning algorithms, etc. that may determine these linkages based on the present meeting, historical information (e.g., completed meetings), results determined based on past meetings, etc.

As a result of determining these linkages, the divergence program 134 may determine a number of blocks to use in representing the present contribution. For example, the present contribution may be represented with a single block or a plurality of blocks. As a result of a plurality of blocks being selected, the divergence program 134 may determine a shape in which to arrange the blocks. The divergence program 134 may position the contribution represented by blocks in the graph 202 according to the linkages with the other contributions and/or based on the meeting in a holistic manner. The divergence program 134 may determine the shape of the contribution and the position in the graph 202 independently or as at least a partial basis to one another. The divergence program 134 may also utilize the expertise or characteristics of the participant who provided the contribution to determine the shape and position of the contribution. For example, the contribution may be related to an identified core intent and the participant may have significant expertise toward the identified core intent. The divergence program 134 may determine that the contribution has a greater relevance toward the discussion of the core intent (e.g., in comparison to a participant who provides a contribution to the identified core intent but with less expertise). Accordingly, the divergence program 134 may determine a shape (e.g., utilize a greater number of blocks) and position (e.g., position in a more central position of the core intent) based on the expertise of the participant.

The divergence program 134 may be configured to place the present contribution in the graph 202 according to different user experience levels. For example, the divergence program 134 may update the graph 202 so that a new contribution is placed therein. In another example, the divergence program 134 may utilize a visual sequence where the new contribution moves toward the end position (e.g., falling from a top of the graph 202).

The divergence program 134 may be configured to place the present contribution in the graph 202 where other contributions may have already been placed prior to the present contribution. According to the exemplary embodiments, the previously placed contributions may be fixed in position. Thus, further contributions may be placed with a known positioning of the previously placed contributions such that the graph 202 is only updated by the further contribution being placed. According to another exemplary embodiment, the graph 202 may be dynamic where previously placed contributions may be updated based on the further contributions. For example, a first contribution may have been placed in the graph 202. However, in view of a further contribution, the positioning of the first contribution may be moved to reflect updated linkages of the contributions. Thus, further contributions may be placed and previous contributions may be moved such that the graph 202 may be updated dynamically.

The divergence program 134 may determine whether a further contribution is provided by one of the participants (decision 314). When a further contribution is provided (decision 314, "YES" branch), the divergence program 134 may continue to update the graph 202 of the progress interface 200 by receiving the contribution, identifying the participant who provided the contribution, determining a shape of the contribution, and placing the contribution in the graph 202.

When no further contributions are being provided (decision 314, "NO" branch), the divergence program 134 may determine whether there is a gap in the graph 202 (decision 316). In monitoring the progress of the meeting and determining linkages among the contributions put forward by participants, the divergence program 134 may determine when a core intent has been completely discussed for purposes of the meeting. For example, the divergence program 134 may track a completion status with respect to discussing a core intent. When the completion status is below a completed threshold (e.g., fully discussed), the completion status may indicate that there is at least one topic or aspect yet to be discussed in the meeting. The topic or aspect yet to be discussed may be represented as the gap. Further thresholds may also be used to represent varying degrees of the completion status (e.g., in progress, at risk, not started, etc.). When a portion of the core intent has not yet been discussed, the divergence program 134 may represent such a topic as a gap in the graph 202. When the gap is for a topic that does not relate to other contributions or is not part of an already raised aspect, the divergence program 134 may represent the gap in a "yet to be discussed" area of the graph 202 (e.g., an upper portion of the graph 202 including the empty region 216). When the gap is for a topic that does relate to other contributions or is part of an already raised aspect, the divergence program 134 may represent the gap within the contributions (e.g., the empty regions 216 shown as empty spots among the contributions).

When there is no gap in the graphical representation (decision 316, "NO" branch), the divergence program 134 may determine that the core intents have been completely discussed. When there is at least one gap in the graphical representation (decision 316, "YES" branch), the divergence program 134 may identify one or more participants who may provide a contribution to fill a gap. The divergence program 134 may refer to the expertise, skill sets, or other characteristics of the participants in the meeting who may be capable of providing the proper contribution. As a result of identifying the one or more participants who may be capable of filling the gap, the divergence program 134 may generate a prompt or reconfigure settings for these one or more participants (e.g., boosting microphone of the selected participant when speaking commences) (step 320). For example, the prompt may notify the selected participant to contribute further to the conversation of the meeting. The participation program 134 may further indicate the core intent, aspect of the core intent, and/or specific reason as to why the selected participant is instructed to further contribute. In monitoring the progress of the meeting and determining a place in the meeting, the participation program 134 may be configured to instruct the selected participant to contribute in a seamless manner (e.g., along a flow of the meeting conversation).

The divergence program 134 may also determine subsequent actions to be performed based on the gaps. For example, the divergence program 134 may identify the gaps and create additional meetings or action items for the corresponding participants to finish a discussion after the present meeting concludes in an online or offline manner.

The divergence program 134 may monitor the progress of the meeting and determine the gaps at various times during the meeting. For example, the divergence program 134 may determine a time remaining of the meeting based on a scheduled end time. When the meeting progresses to a threshold time (e.g., 10% of the scheduled block of time remaining), the divergence program 134 may perform the above described operations regarding the gaps. In another example, the divergence program 134 may continuously monitor the gaps and perform the above described operations regarding the gaps at appropriate times so that the gaps may be filled in a seamless manner (e.g., while a core intent related to the gap is being discussed, interjecting when a change in topic occurs from the core intent related to the gap, etc.).

The exemplary embodiments are configured to aid in running a meeting involving a plurality of participants and maintaining a focus of the meeting toward core intents to be discussed during the meeting. By identifying the participants, the expertise of the participants or the manner by which the participants are capable of contributing to the meeting, and the purpose of the meeting, the exemplary embodiments may determine when a core intent has been discussed to an intended degree or to completion. When a core intent has one or more gaps in the discussion based on the contributions from the participants, the exemplary embodiments may perform operations during the meeting or schedule action items during a post-meeting timeframe so that the gaps may be filled.

Figure 4:
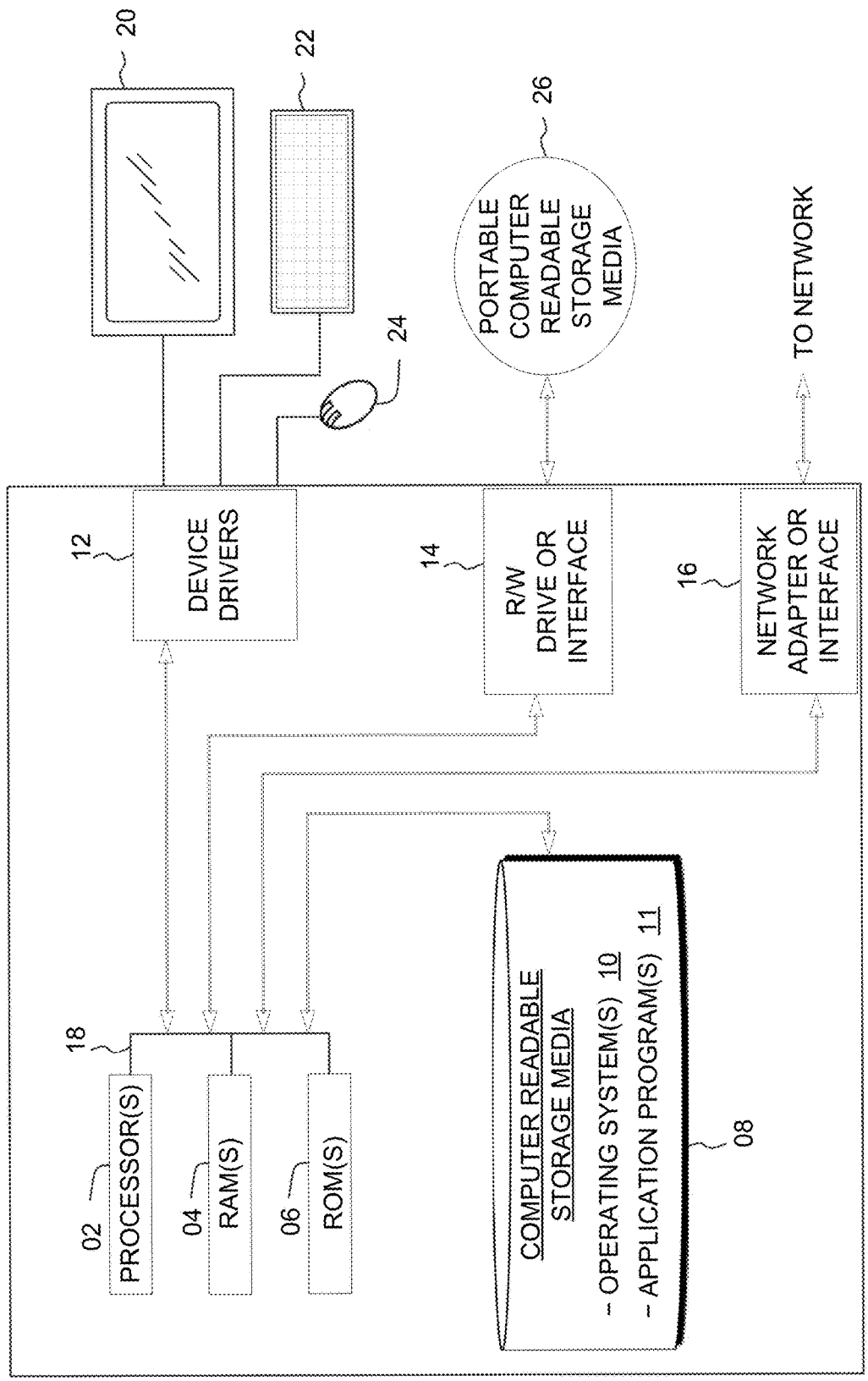
FIG. 4 depicts an exemplary block diagram depicting the hardware components of the meeting divergence evaluation system 100 of FIG. 1, in accordance with the exemplary embodiments.

FIG. 4 depicts a block diagram of devices within the meeting divergence evaluation system 100 of FIG. 1, in accordance with the exemplary embodiments. It should be appreciated that FIG. 4 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
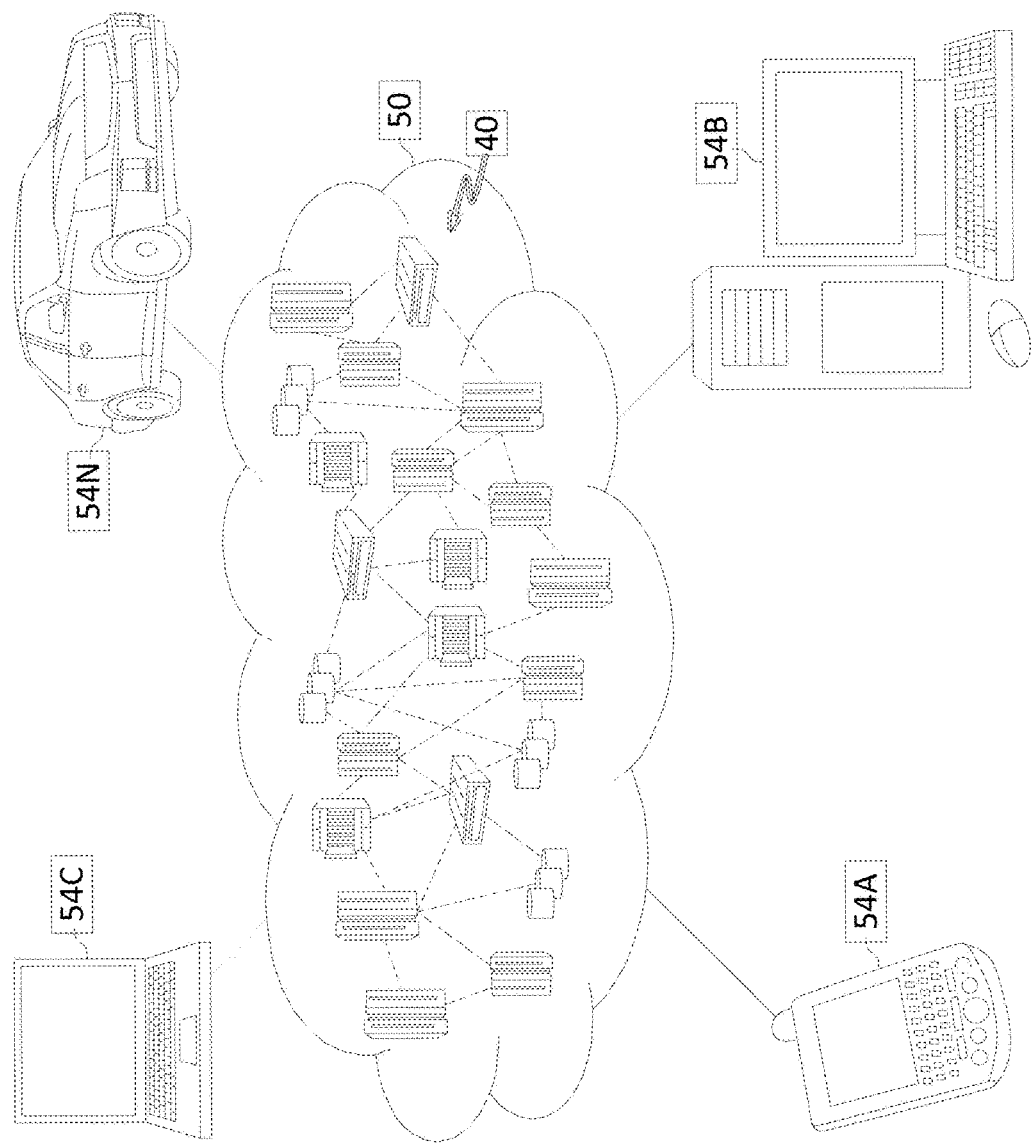
FIG. 5 depicts a cloud computing environment, in accordance with the exemplary embodiments.

Referring now to FIG. 5, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 40 and cloud computing environment 50 can communicate with any type of computerized device over any type of network and/or network addressable connection (e.g., using a web browser).

Figure 6:
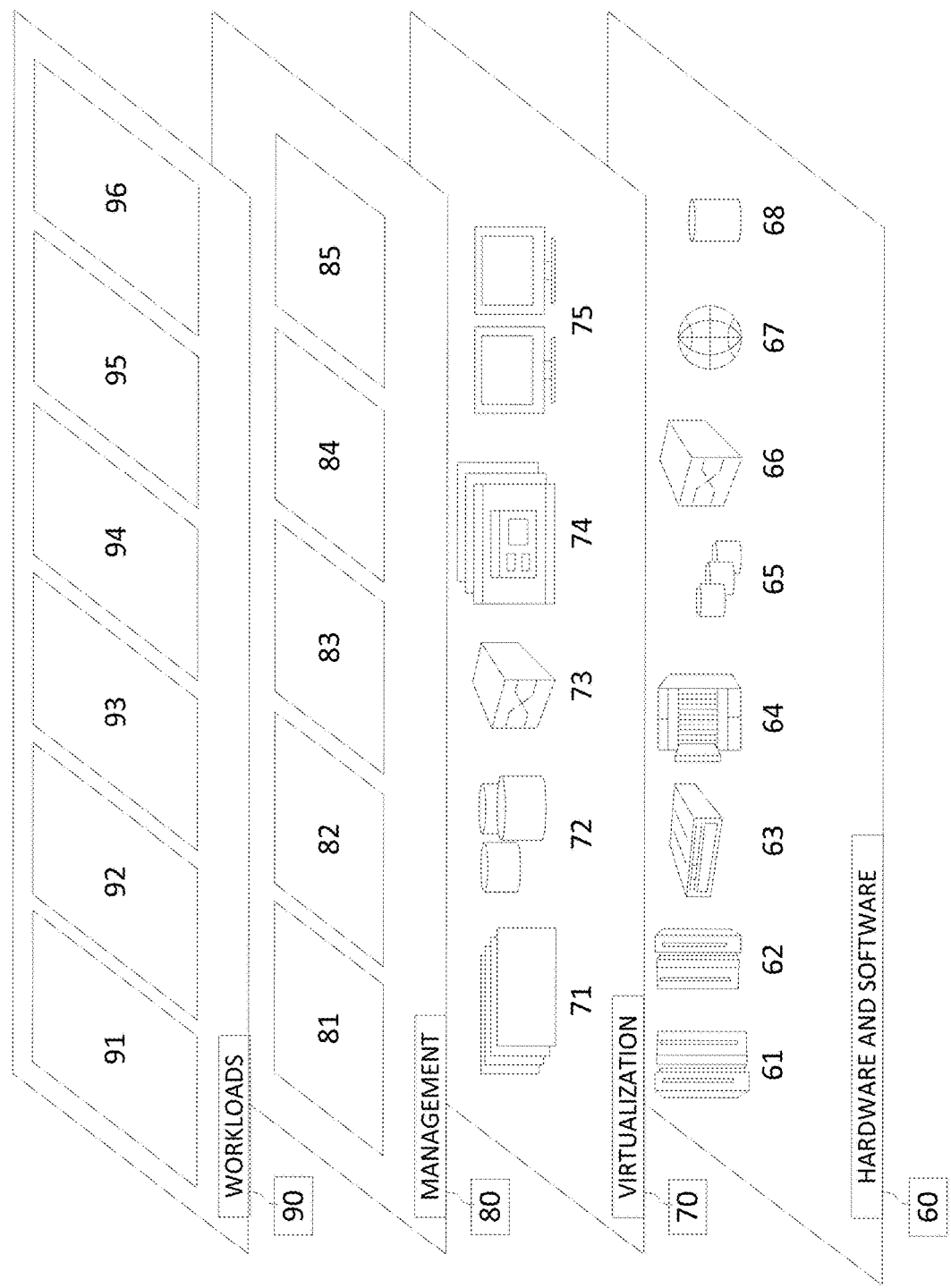
FIG. 6 depicts abstraction model layers, in accordance with the exemplary embodiments.

Referring now to FIG. 6, a set of functional abstraction layers provided by cloud computing environment 50 (FIG. 5) is shown. It should be understood in advance that the components, layers, and functions shown in FIG. 6 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and divergence processing 96.

The exemplary embodiments may be a system, a method, and/or a computer program product at any possible technical detail level of integration. The computer program product may include a computer readable storage medium (or media) having computer readable program instructions thereon for causing a processor to carry out aspects of the exemplary embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the exemplary embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the exemplary embodiments.

Aspects of the exemplary embodiments are described herein with reference to flowchart illustrations and/or block diagrams of methods, apparatus (systems), and computer program products according to the exemplary embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various exemplary embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for managing meeting divergence for a meeting involving a plurality of participants to discuss a plurality of core intents, the method comprising:
   receiving a first contribution from a first one of the participants during the meeting;
   determining a first one of the core intents with which the first contribution is associated;
   determining a linkage of the first contribution to at least one second, previous contribution corresponding to a second one of the core intents provided during the meeting;
   tracking progression of the meeting by generating a graphical representation of the meeting, the graphical representation including a first visual indicator corresponding to the first contribution and at least one second visual indicator respectively corresponding to the at least one second contribution, the first visual indicator positioned with respect to the at least one second visual indicator to represent the linkage, wherein tracking the progression of the meeting further comprises individually tracking a degree of completion for each core intent during the meeting based on at least the first visual indicator and the at least one second visual indicator;
   in response to determining a gap in the graphical representation, identifying a core intent from the first and second one of the core intents with a completion status below a completion threshold as indicated by the gap, wherein the gap is positioned with respect to the first visual indicator and the at least one second visual indicator, the gap being indicative of a topic in one of the first and second one of the core intents;
   in response to a divergence program identifying a capable participant from the plurality of the participants attending the meeting capable of providing a further contribution to fill the gap during the meeting, reconfiguring by the divergence program an audio effect of the capable participant, the audio effect boosting a microphone associated with the capable participant when an audio input from the capable participant is received.

2. The computer-implemented method of claim 1, wherein the meeting topic is identified based on communications among the participants.

3. The computer-implemented method of claim 1, wherein the gap is positioned with respect to the first visual indicator and the at least one second visual indicator to represent a further linkage of the gap to the first contribution and the at least one second contribution.

4. The computer-implemented method of claim 3, further comprising:
   determining an action item for the participants so that the topic is discussed.

5. The computer-implemented method of claim 1, further comprising:
   determining a characteristic of the first participant, the first contribution being based on the characteristic.

6. A computer program product for managing meeting divergence for a meeting involving a plurality of participants to discuss a plurality of core intents, the computer program product comprising:
   one or more non-transitory computer-readable storage media and program instructions stored on the one or more non-transitory computer-readable storage media capable of performing a method, the method comprising:

receiving a first contribution from a first one of the participants during the meeting;

determining a first one of the core intents with which the first contribution is associated;

determining a linkage of the first contribution to at least one second, previous contribution corresponding to a second one of the core intents provided during the meeting;

tracking progression of the meeting by generating a graphical representation of the meeting, the graphical representation including a first visual indicator corresponding to the first contribution and at least one second visual indicator respectively corresponding to the at least one second contribution, the first visual indicator positioned with respect to the at least one second visual indicator to represent the linkage, wherein tracking the progression of the meeting further comprises individually tracking a degree of completion for each core intent during the meeting based on at least the first visual indicator and the at least one second visual indicator;

in response to determining a gap in the graphical representation, identifying a core intent from the first and second one of the core intents with a completion status below a completion threshold as indicated by the gap, wherein the gap is positioned with respect to the first visual indicator and the at least one second visual indicator, the gap being indicative of a topic in one of the first and second one of the core intents;

in response to a divergence program identifying a capable participant from the plurality of the participants attending the meeting capable of providing a further contribution to fill the gap during the meeting, reconfiguring by the divergence program an audio effect of the capable participant, the audio effect boosting a microphone associated with the capable participant when an audio input from the capable participant is received.

7. The computer program product of claim 6, wherein the meeting topic is identified based on communications among the participants.

8. The computer program product of claim 6, wherein the gap is positioned with respect to the first visual indicator and the at least one second visual indicator to represent a further linkage of the gap to the first contribution and the at least one second contribution.

9. The computer program product of claim 8, wherein the method further comprises:

determining an action item for the participants so that the topic is discussed.

10. The computer program product of claim 6, wherein the method further comprises:

determining a characteristic of the first participant, the first contribution being based on the characteristic.

11. A computer system for managing meeting divergence for a meeting involving a plurality of participants to discuss a plurality of core intents, the computer system comprising: one or more computer processors, one or more computer-readable storage media, and program instructions stored on the one or more of the computer-readable storage media for execution by at least one of the one or more processors capable of performing a method, the method comprising:

receiving a first contribution from a first one of the participants during the meeting;

determining a first one of the core intents with which the first contribution is associated;

determining a linkage of the first contribution to at least one second, previous contribution corresponding to a second one of the core intents provided during the meeting;

tracking progression of the meeting by generating a graphical representation of the meeting, the graphical representation including a first visual indicator corresponding to the first contribution and at least one second visual indicator respectively corresponding to the at least one second contribution, the first visual indicator positioned with respect to the at least one second visual indicator to represent the linkage, wherein tracking the progression of the meeting further comprises individually tracking a degree of completion for each core intent during the meeting based on at least the first visual indicator and the at least one second visual indicator;

in response to determining a gap in the graphical representation, identifying a core intent from the first and second one of the core intents with a completion status below a completion threshold as indicated by the gap, wherein the gap is positioned with respect to the first visual indicator and the at least one second visual indicator, the gap being indicative of a topic in one of the first and second one of the core intents;

in response to a divergence program identifying a capable participant from the plurality of the participants attending the meeting capable of providing a further contribution to fill the gap during the meeting, reconfiguring by the divergence program an audio effect of the capable participant, the audio effect boosting a microphone associated with the capable participant when an audio input from the capable participant is received.

12. The computer system of claim 11, wherein the meeting topic is identified based on communications among the participants.

13. The computer system of claim 11, wherein the gap is positioned with respect to the first visual indicator and the at least one second visual indicator to represent a further linkage of the gap to the first contribution and the at least one second contribution.

14. The computer system of claim 13, wherein the method further comprises:

determining an action item for the participants so that the topic is discussed.

* * * * *